United States Patent
Park et al.

(10) Patent No.: US 10,007,082 B2
(45) Date of Patent: Jun. 26, 2018

(54) LENS DRIVING APPARATUS

(71) Applicant: LG INNOTEK CO., LTD., Seoul (KR)

(72) Inventors: Sang Ok Park, Gwangju (KR); Sang Jun Min, Gyeonggi-do (KR); Sang Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/449,356

(22) Filed: Mar. 3, 2017

(65) Prior Publication Data

US 2017/0176707 A1 Jun. 22, 2017

Related U.S. Application Data

(63) Continuation of application No. 15/008,496, filed on Jan. 28, 2016, now Pat. No. 9,618,722, which is a (Continued)

(30) Foreign Application Priority Data

Dec. 13, 2006 (KR) .......................... 10-2006-0127435
Dec. 13, 2006 (KR) .......................... 10-2006-0127436

(51) Int. Cl.
*G02B 7/02* (2006.01)
*G02B 7/04* (2006.01)
(Continued)

(52) U.S. Cl.
CPC .............. *G02B 7/04* (2013.01); *E21B 36/001* (2013.01); *G02B 7/023* (2013.01); *G02B 7/026* (2013.01);
(Continued)

(58) Field of Classification Search
CPC ....................................................... G02B 1/00
(Continued)

(56) References Cited

U.S. PATENT DOCUMENTS 4,566,089 A * 1/1986 Kime .................... G11B 7/093
359/814
5,471,100 A 11/1995 Sakamoto et al.
(Continued)

FOREIGN PATENT DOCUMENTS

CN 1504822 A 6/2004
CN 1713015 A 12/2005
(Continued)

OTHER PUBLICATIONS

Office Action dated Nov. 1, 2011 in Japanese Application No. 2009-541226, filed Dec. 12, 2007.
(Continued)

*Primary Examiner* — James Jones
(74) *Attorney, Agent, or Firm* — Saliwanchik, Lloyd & Eisenchenk

(57) ABSTRACT

Disclosed is a lens driving apparatus. The lens driving apparatus includes a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

12 Claims, 2 Drawing Sheets

Related U.S. Application Data continuation of application No. 14/632,758, filed on Feb. 26, 2015, now Pat. No. 9,256,049, which is a continuation of application No. 13/952,230, filed on Jul. 26, 2013, now Pat. No. 9,019,624, which is a continuation of application No. 13/659,185, filed on Oct. 24, 2012, now Pat. No. 9,250,414, which is a continuation of application No. 13/302,547, filed on Nov. 22, 2011, now Pat. No. 8,300,330, which is a continuation of application No. 13/051,291, filed on Mar. 18, 2011, now Pat. No. 8,089,703, which is a continuation of application No. 12/518,976, filed as application No. PCT/KR2007/006466 on Dec. 12, 2007, now Pat. No. 7,936,526.

(51) Int. Cl.
| | |
|---|---|
| *H02K 41/035* | (2006.01) |
| *E21B 36/00* | (2006.01) |
| *G03B 13/34* | (2006.01) |
| *H04N 5/225* | (2006.01) |
| *H02K 33/02* | (2006.01) |

(52) U.S. Cl.
CPC ............. *G03B 13/34* (2013.01); *H02K 33/02* (2013.01); *H02K 41/0356* (2013.01); *H04N 5/2254* (2013.01)

(58) Field of Classification Search
USPC ........................................ 359/814, 824, 694
See application file for complete search history.

(56) References Cited

U.S. PATENT DOCUMENTS

| | | | |
|---|---|---|---|
| 6,034,940 | A | 3/2000 | Lee |
| 6,591,066 | B2 | 7/2003 | Aoshima |
| 6,710,563 | B2 | 3/2004 | Mizumaki et al. |
| 6,800,970 | B2 | 10/2004 | Aoshima |
| 7,298,562 | B2 | 11/2007 | Sue et al. |
| 7,649,703 | B2 | 1/2010 | Shiraki et al. |
| 9,256,049 | B2 | 2/2016 | Park et al. |
| 2004/0130808 | A1 | 7/2004 | Yoneyama et al. |
| 2005/0286352 | A1 | 12/2005 | Inui |
| 2006/0028929 | A1 | 2/2006 | Osaka |
| 2006/0034599 | A1 | 2/2006 | Osaka |
| 2006/0181632 | A1 | 8/2006 | Makii et al. |
| 2006/0181748 | A1 | 8/2006 | Makii et al. |
| 2006/0214520 | A1 | 9/2006 | Tseng |
| 2006/0245085 | A1 | 11/2006 | Lee et al. |
| 2006/0275032 | A1 | 12/2006 | Hong et al. |
| 2007/0159010 | A1 | 7/2007 | Su et al. |
| 2007/0247539 | A1 | 10/2007 | Ho et al. |
| 2008/0117536 | A1 | 5/2008 | Higuchi |
| 2009/0237815 | A1 | 9/2009 | Kim |

FOREIGN PATENT DOCUMENTS

| | | | |
|---|---|---|---|
| DE | 202006009115 | U1 | 8/2006 |
| JP | 62-125545 | A | 6/1987 |
| JP | 10-334493 | A | 12/1998 |
| JP | 2000-275490 | A | 10/2000 |
| JP | 2005-128405 | A | 5/2005 |
| JP | 2005-234089 | A | 9/2005 |
| JP | 2005-258355 | A | 9/2005 |
| JP | 2006-079072 | A | 3/2006 |
| JP | 3124292 | U | 7/2006 |
| JP | 2006-234866 | A | 9/2006 |
| JP | 2008-026431 | A | 2/2008 |
| KR | 10-0649638 | B1 | 11/2006 |
| TW | 200622466 | A | 7/2006 |
| TW | I265668 | B | 11/2006 |
| WO | WO-2005/088153 | A1 | 9/2005 |
| WO | WO2008063019 | * | 5/2008 |
| WO | WO-2008063019 | A1 | 5/2008 |

OTHER PUBLICATIONS

Office Action dated Apr. 23, 2012 in Korean Application No. 10-2006-0127435, filed Dec. 13, 2006.
Office Action dated Apr. 23, 2012 in Korean Application No. 10-2006-0127436, filed Dec. 13, 2006.
Notice of Allowance dated Oct. 30, 2012 in Korean Application No. 10-2006-0127435, filed Dec. 13, 2006.
Patent Certificate dated May 8, 2013 in Chinese Application No. 200780049087.X, filed Dec. 12, 2007.
Office Action dated Jul. 16, 2013 in Taiwanese Patent Application No. 096147552, filed Dec. 12, 2007.
Office Action dated Feb. 21, 2014 in Taiwanese Application No. 102139064.
Office Action dated Feb. 3, 2015 in Chinese Patent Application No. 201310119692.7.
Office Action dated Apr. 3, 3015 in U.S. Appl. No. 14/632,758.

* cited by examiner

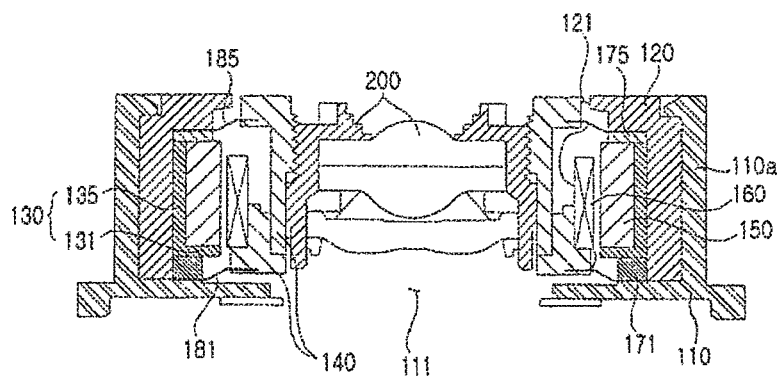
[Fig. 1]
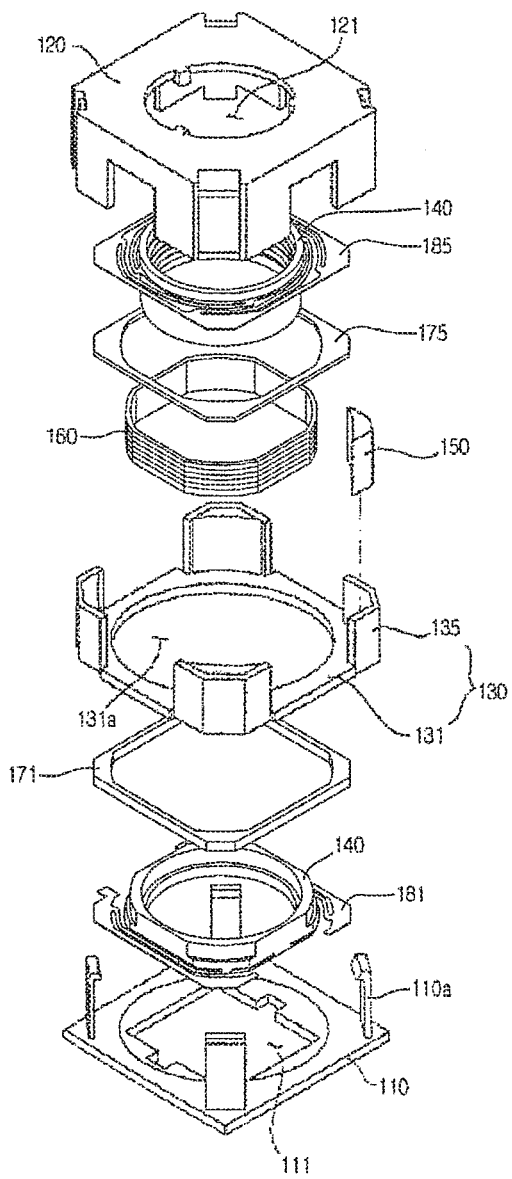
[Fig. 2]

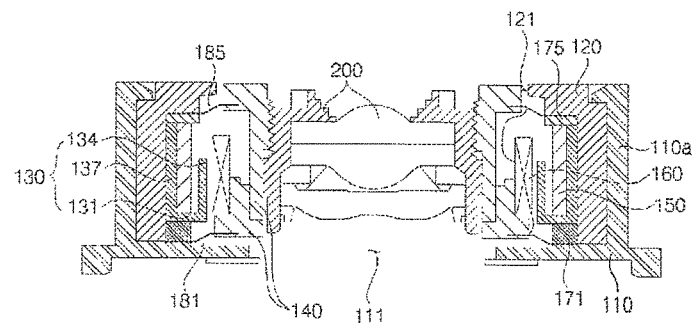
[Fig. 3]
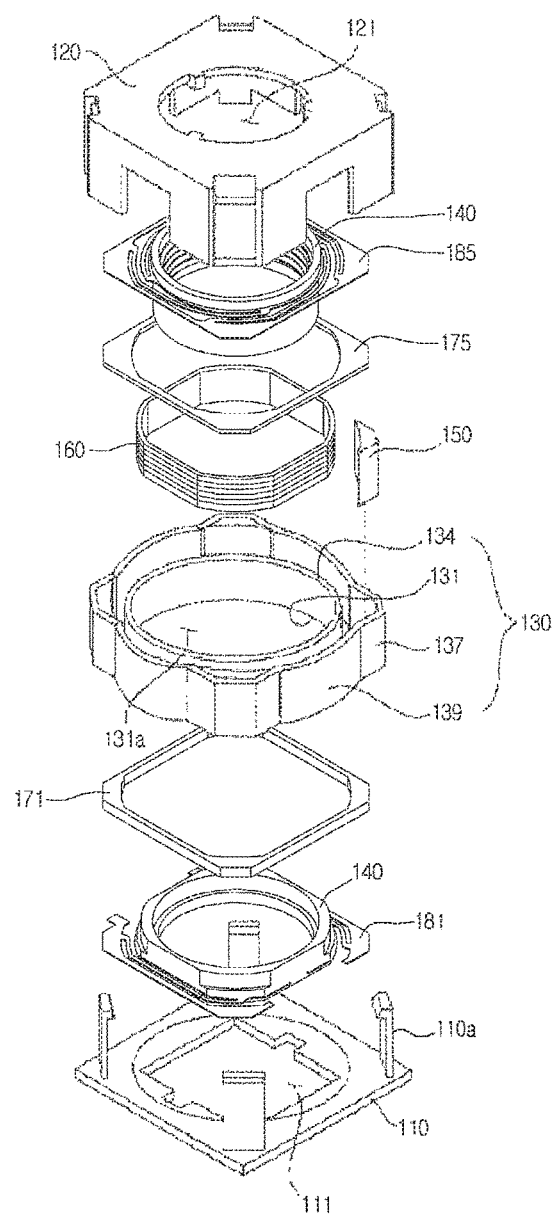
[Fig. 4]

LENS DRIVING APPARATUS

CROSS-REFERENCE TO RELATED APPLICATIONS

This application is a continuation of U.S. application Ser. No. 15/008,496, filed Jan. 28, 2016; which is a continuation of U.S. application Ser. No. 14/632,758, filed Feb. 26, 2015, now U.S. Pat. No. 9,256,049, issued Feb. 9, 2016; which is a continuation of U.S. application Ser. No. 13/952,230, filed Jul. 26, 2013, now U.S. Pat. No. 9,019,624, issued Apr. 28, 2015; which is a continuation of U.S. application Ser. No. 13/659,185, filed Oct. 24, 2012, now U.S. Pat. No. 9,250,414, issued Feb. 2, 2016; which is a continuation of U.S. application Ser. No. 13/302,547, filed Nov. 22, 2011, now U.S. Pat. No. 8,300,330, issued Oct. 30, 2012; which is a continuation of U.S. application Ser. No. 13/051,291, filed Mar. 18, 2011, now U.S. Pat. No. 8,089,703, issued Jan. 3, 2012; which is a continuation of U.S. application Ser. No. 12/518,976, filed Jun. 12, 2009, now U.S. Pat. No. 7,936,526, issued May 3, 2011; which is the U.S. national stage application of International Patent Application No. PCT/KR2007/006466, filed Dec. 12, 2007; which claims priority to Korean Patent Application Nos. 10-2006-0127435, filed Dec. 13, 2006, and 10-2006-0127436, filed Dec. 13, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

Since the electronic appliances equipped with cameras are manufactured in a small size such that a user can carry the electronic appliances, parts for providing camera functions must also be manufactured in a small size. To this end, a dead space must be minimized in a lens driving apparatus that drives a lens of the camera.

Technical Problem

The embodiment provides a lens driving apparatus which can be fabricated in a small size. The embodiment provides a lens driving apparatus in which a dead space is minimized.

Technical Solution

The lens driving apparatus of the embodiment comprises a base formed at a center thereof with a first opening; a housing coupled with the base and having a second opening corresponding to the first opening; a yoke installed on the base and including a horizontal plate having a third opening corresponding to the first opening and a vertical plate protruding upward from the horizontal plate; a bobbin movably installed in the yoke and coupled with a lens module; a coil fixedly disposed around the bobbin; a plurality of magnets provided at the vertical plate of the yoke to face the coil; and a spring installed on at least one of upper and lower portions of the yoke to return the bobbin, which has moved up due to interaction between the magnet and the coil, to its initial position.

Advantageous Effects

The embodiment can provide a lens driving apparatus which can be fabricated in a small size.

The embodiment can provide a lens driving apparatus in which a dead space is minimized.

BRIEF DESCRIPTION OF THE DRAWINGS

FIG. 1 is a sectional view of a lens driving apparatus according to a first embodiment;

FIG. 2 is an exploded perspective view of the lens driving apparatus shown in FIG. 1;

FIG. 3 is a sectional view of a lens driving apparatus according to a second embodiment; and FIG. 4 is an exploded perspective view of the lens driving apparatus shown in FIG. 3.

DETAILED DESCRIPTION

Hereinafter, a lens driving apparatus according to an embodiment will be described with reference to accompanying drawings.

FIG. 1 is a sectional view of a lens driving apparatus according to a first embodiment, and FIG. 2 is an exploded perspective view of the lens driving apparatus shown in FIG. 1.

Referring to FIGS. 1 and 2, the lens driving apparatus includes a base 110 and a housing 120, which are coupled to each other to form a predetermined space therebetween. The base 110 has a polygonal shape (e.g. rectangular plate shape) and a first opening 111 is formed at the center of the base 110. The housing 120 has a hexahedral structure and a bottom surface thereof is opened. Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a polygonal shape (e.g. rectangular plate shape) corresponding to the base 110 and is mounted on the base 110, and a vertical plate 135 provided at an outer peripheral portion of the horizontal plate 131 in correspondence with the outer peripheral portion of the housing 120.

A third opening 131a, which corresponds to the first opening 111 of the base 110, is formed in the horizontal plate 131, and the vertical plate 135 protrudes upward from the outer peripheral portion of the horizontal plate 131.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 135 of the yoke 130, and a coil 160 is disposed around the bobbin 140.

The coil 160 has a cylindrical structure or a polygonal structure and faces the magnet 150.

In the embodiment, the coil 160 has a substantially octagonal structure, in which edges of the coil 160 facing the magnet 150 are curved.

At this time, planes of the magnet 150 that face the coil 160 are also curved such that the electromagnetic field can be maximized. That is, the planes of the coil 160 and the magnet 150, which face to each other, have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

FIG. 3 is a sectional view of a lens driving apparatus according to a second embodiment, and FIG. 4 is an exploded perspective view of the lens driving apparatus shown in FIG. 3.

Referring to FIGS. 3 and 4, the lens driving apparatus includes a base 110 and a housing 120, which are coupled to each other to form a predetermined space therebetween. The base 110 has a rectangular plate shape and a first opening 111 is formed at the center of the base 110. The housing 120 has a hexahedral structure and a bottom surface thereof is opened.

Coupling members 110a are provided at corner edges of the base 110. The coupling members 110a protrude upward from the base 110 and are coupled with the housing 120 while making contact with an outer surface and an upper surface of the housing 120.

A second opening 121 is formed in the upper surface of the housing 120 corresponding to the first opening 111 of the base 110. The bottom surface of the base 110 is connected to an electronic appliance (not shown) and a circuit board (not shown) having an image sensor is provided in the first opening 111.

A metal yoke 130 is fixedly disposed between the base 110 and the housing 120. The yoke 130 includes a horizontal plate 131, which has a rectangular plate shape corresponding to the base 110 and is mounted on the base 110.

A third opening 131 a, which corresponds to the first opening 111 of the base 110, is formed at the center of the horizontal plate 131. In addition, a ring-shaped vertical wall 134 is formed on the horizontal plate 131 while surrounding the third opening 131a and vertical plates 134 protrude upward from corner edges of the horizontal plate 131. The vertical plates 137 are fixedly supported by edges of the housing 120.

Since the yoke 130 has a rectangular shape corresponding to the shape of the base 110 and the housing 120 and is installed between the base 110 and the housing 120, a dead space may not exist among the base 110, the housing 120 and the yoke 130, and the yoke 130 may not rotate between the base 110 and the housing 120.

A cylindrical bobbin 140 is installed at an inner portion of the vertical wall 134 of in the yoke 130. The bobbin 140 is movable up and down through the second opening 121. A lens module 200 including a lens and a lens supporter is coupled with the bobbin 140.

A magnet 150 having an angular column structure is fixed to an inner surface of the vertical plate 137 of the yoke 130, and a coil 160 is disposed around the bobbin 140. The coil 160 has a cylindrical structure or a polygonal structure and faces the vertical wall 134.

In the embodiment, the coil 160 has a substantially octagonal structure, in which edges of the coil 160 facing the magnet 150 are curved.

At this time, a plane of the magnet 150, which is arranged sequentially to the vertical wall 134, is curved corresponding to the curvature of the coil 160 and the vertical wall 134 such that the electromagnetic field can be maximized. That is, the coil 160, the plane of the magnet 150 facing the coil 160, and the vertical wall 134 have the same curvature.

In the embodiment, a plurality of magnets 150 are disposed at edges of the yoke 130 to minimize the space occupied by the magnet 150.

Therefore, in the outer peripheral surface of the coil 160, an area that faces the magnets 150 is smaller than an area that does not face the magnets 150. In detail, the area that faces the magnets 150 is greater than 20% and smaller than 50% in the outer peripheral surface of the coil 160.

If the area that faces the magnets 150 is less than 20% in the outer peripheral surface of the coil 160, magnetic force is too insufficient to move up the coil 160. In addition, if the area that faces the magnets 150 is greater than 50% in the outer peripheral surface of the coil 160, the space occupied by the magnets 150 is too large.

According to the embodiment, in order to increase the magnetic force while reducing the space occupied by the magnets 150, the magnet 150 has an angular column structure in which a plane of the magnet 140 that faces the coil 160 is curved.

Therefore, the magnet 150 has later faces including a curved plane that faces the coil 160 and at least one flat plane that does not face the coil 160. In the embodiment, the magnet 150 includes one curved plane and three flat planes.

Thus, as current is applied to the coil 160, the coil 160 moves up together with the bobbin 140 due to an electric field generated from the coil 160 and a magnetic field generated from the magnet 150. Accordingly, the lens module 200 coupled with the bobbin 140 is also moved up.

First and second spacers 171 and 175 are installed between a bottom surface of the yoke 130 and the base 110 and between the upper surface of the yoke 130 and the housing 120, respectively. The first and second spacers 171 and 175 have elasticity to compensate for the assembling tolerance between the parts.

In addition, outer peripheral portions of first and second springs 181 and 185 having ring shapes are inserted between the bottom surface of the first spacer 171 and the base 110 and between the upper surface of the second spacer 175 and the housing 120, respectively.

Inner peripheral portions of the first and second springs 181 and 185 are integrally formed with the bobbin 140. As the current being applied to the coil 150 is shut off, the bobbin 140 is moved down by the first and second springs 181 and 185, so that the bobbin 140 returns to its initial position.

Although the embodiment shows the first and second springs 181 and 185, it is also possible to provide only one of the first and second springs 181 and 185.

An outer peripheral portion of the horizontal plate 131, which is arranged between adjacent vertical plates 137 of the yoke 130, has a curvature corresponding to that of the vertical wall 134. In addition, a vertical connection plate 139 that connects the adjacent vertical plates 137 to each other is provided on the outer peripheral portion of the horizontal plate 131 in a curved shape. The vertical connection plate 139 prevents penetration of impurity and improves the aesthetic appearance of the lens driving apparatus.

INDUSTRIAL APPLICABILITY

The lens driving apparatus according to the embodiment can be manufactured in a small size, and can be applied to various electronic appliances equipped with a camera function.

What is claimed is:

1. A lens driving apparatus comprising:
   a base;
   a yoke disposed on the base and including a plate, a first side plate extending from an outer peripheral portion of the plate, and a second side plate extending from an inner peripheral portion of the plate;
   a bobbin disposed in the yoke;
   a coil disposed on the bobbin;
   an upper spring coupled to an upper portion of the bobbin;
   a lower spring coupled to a lower portion of the bobbin; and
   a magnet disposed between the coil and the first side plate of the yoke,
   wherein the magnet includes a first surface facing towards the second side plate of the yoke and is disposed at a corner of the yoke,
   wherein the first surface of the magnet has a shape that corresponds to that of the second side plate of the yoke,
   wherein the coil includes a first portion between the bobbin and the first surface of the magnet and a second portion adjacent to the first portion,
   wherein the first portion of the coil has a shape corresponding to that of the first surface of the magnet, and
   wherein the second portion of the coil is not overlapped with the magnet in a direction perpendicular to an optical axis.

2. The lens driving apparatus according to claim 1, wherein the magnet includes a second surface including a plurality of surfaces lacing the first side plate of the yoke.

3. The lens driving apparatus according to claim 1, wherein a height of the first side plate of the Yoke is greater than a height of the second side plate of the yoke.

4. The lens driving apparatus according to claim 3, wherein the plate of the yoke has a polygonal shape.

5. The lens driving apparatus according to claim 1, wherein the first portion of the coil and a first plane of the magnet facing the coil have the same curvature.

6. The lens driving apparatus according to claim 1, wherein, on an outer peripheral surface of the coil, an area facing the magnet is smaller than an area that does not face the magnet.

7. The lens driving apparatus according to claim 6, wherein the outer peripheral surface of the coil comprises four corner-facing sides respectively facing corners of the yoke, wherein an area of the four corner-facing sides is greater than 20% of a total area of the outer peripheral surface of the coil and smaller than 50% of the total area of the outer peripheral surface of the coil.

8. The lens driving apparatus of claim 1, wherein the magnet comprises an upper surface, a lower surface opposite to the upper surface, and a plurality of surfaces facing the first side plate of the yoke.

9. The lens driving apparatus of claim 1, wherein the yoke is a metal yoke.

10. The lens driving apparatus as claimed in claim 1, wherein the horizontal-plate of the yoke has a rectangular shape.

11. An electronic appliance comprising the lens driving apparatus according to claim 1.

12. A camera comprising the lens driving apparatus according to claim 1.

* * * * *